United States Patent [19]

Haytayan

[11] Patent Number: 4,497,377
[45] Date of Patent: Feb. 5, 1985

[54] PNEUMATIC TOOL

[75] Inventor: Harry M. Haytayan, Lincoln, Mass.

[73] Assignee: Pneutek, Inc., Hudson, N.H.

[21] Appl. No.: 965,107

[22] Filed: Nov. 30, 1978

[51] Int. Cl.³ .......................... B25C 1/04; B25C 5/02
[52] U.S. Cl. ........................................... 173/15; 227/8
[58] Field of Search ...................... 173/15, 16; 227/8

[56] References Cited

U.S. PATENT DOCUMENTS

| | | | |
|---|---|---|---|
| 716,274 | 12/1902 | Peirce, Jr. | 173/91 X |
| 2,807,021 | 9/1957 | Chellis | 173/15 X |
| 3,599,854 | 8/1971 | Pearson et al. | 227/7 |
| 3,601,007 | 8/1971 | Korth | 227/130 X |
| 3,786,847 | 1/1974 | Schera, Jr. | 173/90 X |
| 4,040,554 | 8/1977 | Haytayan | 227/8 |
| 4,122,904 | 10/1978 | Haytayan | 227/8 X |

Primary Examiner—Robert Mackey
Attorney, Agent, or Firm—Schiller & Pandiscio

[57] ABSTRACT

A pneumatic tool is disclosed for use in puncturing or hammering applications, particularly cattle stunning and the like.

The tool generally comprises a cylinder, a piston slidably mounted in the cylinder, a hammer or striker connected to the piston, an air manifold or supply chamber, a reservoir connected to the air manifold, a quick-acting poppet valve for rapidly admitting air upon command to the upper end of the cylinder from the air reservoir, a trigger-operated primer valve adapted to (1) transmit high pressure air from the air manifold to the lower end of the cylinder so as to cause the piston to retract the hammer when the poppet valve is closed, or (2) exhaust high pressure air from the underside of the piston so that when the poppet valve is opened high pressure air from the air reservoir will cause the piston to drive the hammer through its impact stroke, and a feeler-operated control valve adapted to (1) transmit high pressure air from the air reservoir to the poppet valve so as to cause the poppet valve to close off the upper end of the cylinder from the high pressure air held in the reservoir, or (2) exhaust high pressure air from the poppet valve so as to cause the poppet valve to open so as to expose the upper end of the cylinder to the high pressure air in the reservoir, and thereby cause the piston to drive the hammer through its impact stroke if the primer valve is suitably set.

8 Claims, 3 Drawing Figures

PNEUMATIC TOOL

BACKGROUND OF THE INVENTION

This invention relates to pneumatic driving apparatus in general, and more particularly to a novel type of pneumatic tool for use in puncturing or hammering operations, such as cattle stunning and the like.

Methods for commercial beef production generally call for first killing the animal and later bleeding and dressing the carcass. The killing of the animal is usually accomplished by means of a single, fatal blow to the back portion of the head so as to cause immediate death. This mode of slaughtering cattle is generally known as cattle stunning.

At one time the killing blow was delivered by an operator wielding a heavy object such as a club or hammer. Today, however, special driver tools are employed which are designed to be placed against the back of the animal's head and which, upon actuation, pass a long rod into a region of the animal's brain so as to cause instantaneous death. A number of different driver tools, or cattle stunners as they are generally called, are presently on the market. These are believed to include both pneumatic and explosive-actuated devices.

OBJECTS OF THE PRESENT INVENTION

One of the objects of the present invention is to produce a cattle stunner which is cheaper, quieter, more reliable, lighter and safer than those cattle stunners presently available.

Another object is to produce a pneumatic cattle stunner which is adapted to be bump-fired, i.e., to be actuated by contacting the rear of the animal's head with the bottom of the tool, in order that the operating speed of the tool be increased so that the animal is given no opportunity for excess movement during slaughtering.

Yet another object is to provide a driver tool which can be used to stamp, puncture or hammer an inanimate workpiece.

Still another object is to provide a tool which can be adapted to set rivets.

Another object is to provide a tool which can be mounted in a frame or cabinet for use in a production line.

And still another object is to produce a tool which has many parts in common with nail drivers of the type disclosed in U.S. patent application Ser. No. 763,061, now U.S. Pat. No. 4,122,904, issued Oct. 31, 1978 and U.S. Pat. No. 4,040,554, granted Aug. 9, 1977.

SUMMARY OF THE PRESENT INVENTION

These and other objects of the present invention are addressed by providing a tool which comprises a cylinder, a piston slidably mounted in the cylinder, a hammer connected to the piston, an air manifold, an air reservoir connected to the air manifold, a quick-acting poppet valve for rapidly admitting air upon command to the upper end of the cylinder from the air reservoir, a trigger-operated primer valve adapted to (1) transmit high pressure air from the air manifold to the lower end of the cylinder so as to cause the piston to retract the hammer when the poppet valve is closed, or (2) exhaust high pressure air from the underside of the piston so that when the poppet valve is opened high pressure air from the air reservoir will cause the piston to drive the hammer through its impact stroke, and a feeler-operated control vavle adapted to (1) transmit high pressure air from the air reservoir to the poppet valve so as to cause the poppet valve to close off the upper end of the cylinder from the high pressure air held in the reservoir, or (2) exhaust high pressure air from the poppet valve so as to cause the poppet valve to open and thereby expose the upper end of the cylinder to the high pressure air in the reservoir.

DESCRIPTION OF THE DRAWINGS

Still other objects and features of the present invention will be rendered obvious by the following detailed description of the preferred embodiment thereof, which is to be considered together with the accompanying drawings wherein like numbers refer to like parts and further wherein.

DESCRIPTION OF THE PREFERRED EMBODIMENT

Figures 1, 2, 3:
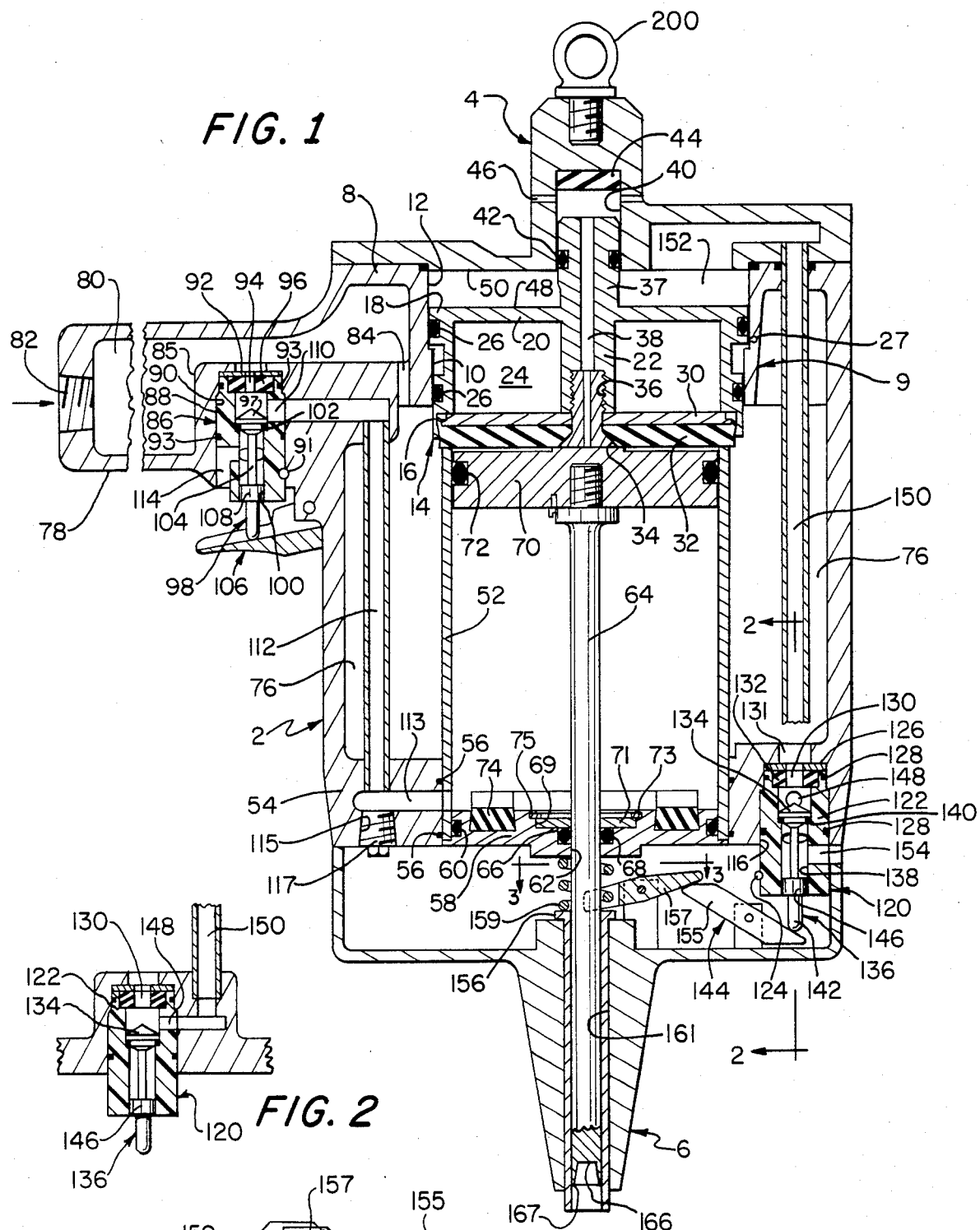
FIG. 1 is a sectional view in elevation of the preferred form of the present invention, showing the device with its hammer in a retracted position.
FIG. 2 is a sectional view taken along line 2—2 of FIG. 1.
FIG. 3 is a cross-sectional view taken along line 3—3 of FIG. 1.

Referring first to FIG. 1, the preferred embodiment of the present invention generally comprises a hollow housing 2, a cap member 4 and a nozzle 6. Cap member 4 and nozzle 6 are detachably secured to the upper and lower ends of the housing, respectively, by means of screws (not shown).

The upper end of housing 2 is provided with an end wall 8 having a depending hollow section 9 which serves as a poppet valve housing. The latter has cylindrical bore 10, along with a cylindrical counterbore 12. A hollow poppet valve, generally identified by a numeral 14, is slidably mounted in the bores 10 and 12. Poppet valve 14 generally comprises a cylindrical wall 16 sized to make a close sliding fit with bore 10, a peripheral flange 18 at the upper end of wall 16, and an upper end wall 20. Flange 18 is adapted to make a close sliding fit with counterbore 12. The poppet valve also includes a centrally located boss 22 which is formed integral with end wall 20 and spaced from wall 16 so as to form an internal annular cavity 24. The outer surfaces of wall 16 and flange 18 are provided with circumferentially-extending grooves in which are seated resilient sealing rings 26. Rings 26 contact the inner surfaces of hollow section 9 at bores 10 and 12 and serve to prevent leakage of fluid therebetween while allowing the poppet valve to move axially. The upper end wall 8 of housing 2 may be provided with one or more passageways 27 that lead from the lower part of counterbore 12 to the atmosphere. These passageways serve as bleeds to prevent a pressure buildup between the lower side of flange 18 and the annular shoulder formed at the junction of bore 10 and counterbore 12, and are located such that they are always positioned below the upper seal 26 regardless of the position of the poppet valve.

The bottom end of the poppet valve is closed off by a circular plate 30. A circular resilient pad 32 is bonded to plate 30 and the elements 30 and 32 are formed with concentric central apertures for accommodating a hollow screw or bushing 34. Bushing 34 is screwed into the lower end of an axial bore 36 which is formed in boss 22 and serves to hold members 30 and 32 securely in place. The poppet valve also has an axial extension 37 which is formed integral with end wall 20 and which is provided with a central bore 38. Bore 38 communicates with the area below the poppet valve via the interior of hollow screw 34. Cap member 4 is provided with a hollow recess 40 of circular cross-section for accommodating extension 37, and the top section of extension 37 is sized so as to make a close sliding fit with the surrounding wall of the cap member at recess 40. The top of extension 37 is provided with a circumferentially-extending groove which accommodates a sealing ring 42. Ring 42 serves to prevent fluid leakage between the extension 37 and the surrounding walls defining recess 40, while still allowing extension 37 free axial movement within the recess 40. A resilient valve seat 44 is secured at the top of hollow recess 40 and serves to engage extension 37 when the poppet valve is raised upwards. Additionally, cap member 4 includes a series of ports 46 which extend from recess 40 to the atmosphere. Ports 46, recess 40, bore 38 and the interior passage within hollow screw 34 constitute a vent for fluid discharge from the underside of the poppet valve to the atmosphere. Furthermore, the axial dimension of recess 40, extension 37, bore 10, counterbore 12, flange 18 and wall 16 are such that when the poppet valve is moved upward far enough for the top of extension 37 to seat on valve seat 44, a small gap will exist between the upper surface 48 of the poppet valve and the end surface 50 of cap 4. The effective surface area of surface 48 is made greater than the surface area of the underside of pad 32.

Pad 32 serves to form a tight seal between the poppet valve and the upper edge of a hollow cylinder 52 when the poppet valve is in its down or "closed" position. Cylinder 52 is of constant diameter throughout its length and is secured at its bottom to the bottom end wall 54 of housing 2. Preferably, bottom end wall 54 is provided with two grooves which accommodate resilient sealing rings 56 for forming airtight seals between the cylinder and end wall 54. The bottom end of cylinder 52 is closed off by a plug 58. Plug 58 mounts a sealing ring 60 in an exterior, circumferential groove for preventing any leakage of fluid between the plug and the cylinder. The plug is also formed with a round axial bore 62 to slidably accommodate a hammer or striker 64. A first counterbore 66 is formed in the wall of plug 58 for accommodating a resilient sealing ring 68 which surrounds and engages hammer 64 with just enough force to prevent leakage of fluid therebetween while allowing the hammer to move axially. A second counterbore 69 is formed about bore 62 just above counterbore 66 and receives a thrust washer 71 which serves to retain seal 68 in place and also guide hammer 64 as it reciprocates. A snap ring 73 is disposed in a groove 75 and serves to hold washer 71 in place. The upper end of the hammer 64 is attached to a circular piston 70 which has flat upper and lower surfaces and is sized so as to make a close sliding fit with the interior surface of cylinder 52. Piston 70 is provided with a peripheral groove in which is disposed a sealing ring 72 which prevents leakage of fluid between piston 70 and cylinder 52 while allowing the piston to move freely within the cylinder. A cushion member 74 is attached to the upper surface of plug 58 and serves to receive the impact of piston 70 upon plug 58.

The outer surface of cylinder 52 is spaced from the interior surface of housing 2 so as to form a chmaber 76 which serves as an air reservoir. Additionally, the outer diameter of cylinder 52 is less than the outer diameter of the poppet valve by a selected amount so that a substantially marginal portion of the poppet valve projects radially beyond the cylinder. Housing 2 is also formed with a hollow lateral extension 78 which is formed integral with the housing and which defines a manifold chamber 80 for supplying air or other pressurized fluid to the air reservoir chamber 76, and also to other portions of the device as hereinafter described. Extension 78 has an inlet port 82 which is threaded for attachment to a flexible hose line leading to a regulated source of fluid pressure, e.g., an air compressor. A passageway 84 allows chamber 80 to communicate directly with reservoir 76.

One portion of housing extension 78 is formed with a relatively thick wall section 85 for accommodating a trigger-operated primer valve 86. Valve 86 comprises a valve casing 88 secured in a bore 90 by a dowel pin 91. A metal washer 92 is disposed between the top of the valve casing and the bore 90, and a pair of resilient rings 93 and secured in the exterior of casing 88 for forming an airtight seal with the walls of bore 90. Housing 88 has an opening at one end which defines a port 94 and communicates with reservoir 80, with a resilient pad 96 secured at the inner end thereof. Pad 96 serves as a valve seat for a valve head 97 which is secured to a valve rod assembly 98. The other end of casing 88 has a bore 100 to accommodate the rod assembly 98. At the upper end of bore 100 is a shoulder 102 which serves as a seat for valve head 97. A valve rod assembly 98 comprises a rod 104 which couples valve head 97 to a trigger assembly 106 and a piston 108 which is attached to rod 104 and makes a sliding fit with bore 100. Valve casing 88 has a side port 110 that connects port 94 with a tube 112 which leads to a passageway 113 that in turn leads to the interior of the cylinder beneath piston 70. Valve casing 88 also has a bottom port 114 which leads out to the atmosphere. Valve head member 97 is adapted to close off port 94 when it is moved upward to seat securely against pad 96 and to close off port 114 when it is seated on shoulder 102. However, in either position the valve head is incapable of closing off port 110 which leads to the interior of cylinder 52 via passageway 112. Hence, when valve member 97 is seated against shoulder 102, pressurized air can flow from manifold chamber 80 into the lower end of cylinder 52 via ports 94 and 110, tube 112 and passageway 113, while port 114 is closed off. When port 94 is closed off, however, pressurized air can be exhausted from the lower end of cylinder 52 via passageway 113, tube 112, port 110 and port 114. It is to be noted that the presence of pressurized air in manifold 80 will normally seat valve head 97 upon valve seat 102 unless trigger assembly 106 is moved upwards. Trigger assembly 106 is pivotally mounted to casing 2.

It is also to be noted that the upper and lower ends of tube 112 are secured in the wall sections 85 and 54 by a press fit, or by a threaded connection. Tube 112 is installed by inserting it into the housing via an opening 115 in wall section 54. Opening 115 is closed off by a plug 117.

The bottom end wall 54 of housing 2 is also provided with a circular bore 116 for accommodating a feeler-operated control valve 120. Control valve 120 comprises a valve casing 122 secured in bore 116 by a dowel or roll pin 124. A metal washer 126 is disposed between the top of the valve casing and the bore 116, and a pair of resilient O-rings 128 are secured in the exterior of the casing for forming an airtight seal with the walls of bore 16. Valve casing 122 has an opening at one end which defines a port 130 and communicates with reservoir 76 via an opening 131 in wall section 54, with a resilient pad 132 secured at the inner end thereof. Pad 132 serves as a valve seat for a valve head 134 which is secured to a valve rod assembly 136. The other end of casing 122 has a bore 138 to accommodate rod assembly 136. At the upper end of bore 130 is a shoulder 140 which also serves as a seat for valve head 134. The valve rod assembly 136 comprises a valve rod 142 which couples valve head 134 to a linkage 144 and a piston 146 is attached to rod 142 and makes a sliding fit with bore 138. Valve casing 122 has a side port 148 (FIGS. 1 and 2) that connects port 130 with a tube 150 which leads to an airtight chamber 152 formed between the top of the poppet valve and the bottom of the housing cap 4. Casing 122 also has a bottom port 154 which vents out into the atmosphere via a hole in casing 2. Valve head member 134 is adapted to close off port 130 when it is seated on pad 132 and to close off port 154 when it is seated on shoulder 140. However, in no position can head 134 close off side port 148 which leads to chamber 152. Hence, when valve head 134 is seated on shoulder 140, pressurized air from reservoir 76 can flow into chamber 152 to act on the top of poppet valve 14. However, when port 130 is closed off, pressurized air will be vented from chamber 152 via passageway 150, port 148 and port 154. It should also be noted that the presence of pressurized air in reservoir 76 will seat valve head 134 upon valve seat 140 unless suitable pressure is applied to linkage 144 to raise the valve head via rod assembly 136.

Linkage 144 serves to couple rod assembly 136 to a feeler member 156 (see also FIG. 3). Feeler 156 is a cylindrical tube or hollow rod slidably disposed around the bottom of cylindrical hammer 64 within a bore 161 in nozzle 6. As seen in FIGS. 1 and 3, linkage 144 comprises two center-pivoted levers 155 and 157, both pivotally mounted to the upper end of nozzle 6. One end of lever 155 engages valve rod 142 and the other engages the adjacent end of lever 157. The opposite end of lever 157 is forked or bifurcated so as to embrace hammer 64 and engage a flange formed on the upper end of feeler 156. Feeler 156 normally protrudes somewhat from the bottom of nozzle 6 due to a compression spring 159 and also the downward force exerted by the linkage 144 under the downward pressure on valve head 134 from the pressurized air in reservoir 76. It should be noted that the end of feeler 156 always extends further beyond the bottom of nozzle 6 than the end of hammer 64 when the hammer is in its raised position and the feeler is not engaged with a workpiece. When feeler 156 contacts an object with sufficient force to overcome the downward pressure exerted by spring 159 and linkage 144, the feeler will move upwards within nozzle 6 and thereby cause linkage 144 to seat valve head 134 on seal 132 and thereby close off the port 130. Typically, feeler 156 extends ¼-½" past the bottom of nozzle 6 in its extended position and is adapted to yield under a pressure of approximately 10 psi.

Operation of the tool will now be described. First air under pressure, e.g., 175 psi, is supplied to the manifold chamber 80 by connecting inlet port 82 to a suitable supply of pressurized air (not shown). This pressurized air passes from chamber 80 through passageway 84 into reservoir chamber 76. The air in chamber 76 proceeds through port 130 of feeler valve 120 where it applies a downward force to valve head 134, forcing it downwards to seat on shoulder 140 and thereby close off port 148 from port 154. As valve head 134 moves downwards, it causes linkage 144 to project feeler 156 out the bottom of nozzle 6. Simultaneously, pressurized air enters port 148 and proceeds up passageway 150 to chamber 152 where it acts upon the poppet valve 14 and forces it downward until rubber disc 32 seats firmly upon and forms a tight seal with the upper edge of cylinder 52. While this is occurring, pressurized air from manifold chamber 80 enters port 94 of the trigger-operated primer valve 86 and forces the valve head 97 down against shoulder 102 so as to close off port 114 from the pressurized air source. Air passing through port 94 simultaneously flows through port 110 of valve 86, tube 112 and passageway 113 into the bottom end of the interior chamber of cylinder 52. The introduction of this pressurized air into the interior of cylinder 52 raises piston 70 to the top of cylinder 52 until it contacts the bottom pad 32 of poppet valve 14. It is to be noted that the effective surface area at the top of poppet valve 14 is greater than the bottom surface area of the piston 70 so as to effectively insure that the poppet valve will settle upon the top of cylinder 52 rather than settling into an equilibrium condition with the piston at some point above cylinder 52. In addition, it should be noted that any air trapped beneath the upper end of the piston and the disc 32 will be exhausted to the atmosphere via the interior of screw 34, passageway 38 and ports 46. Furthermore, any air trapped beneath flange 18 of the poppet valve and the walls of counterbore 12 will be exhausted to the atmosphere through the vents 27.

The pressurized tool enters a standby state once poppet valve 14 engages piston 70 and seats upon the top of cylinder 52. In this state the tool cannot be fired simply by engaging feeler 156 with a firm surface. Instead, in order to fire, the tool must first be primed by pulling trigger assembly 106 upwards far enough to cause valve head 97 to block off port 94. This causes the pressurized air acting on the underside of piston 70 to be vented to the outside atmosphere via passageway 113 and 112 and ports 110 and 114, thus relieving the pressure forcing piston 70 against poppet valve 14. With the cylinder chamber vented, the tool is primed, with only the friction of the various seals holding the hammer against the bottom of the poppet valve. Now if feeler 156 should be brought down against an object so that it is forced to retract into housing 2, valve member 134 will move upwards to close off port 130 from the pressurized air supply in reservoir 76 and thereby vent the pressurized air from chamber 152 via passageway 150, and ports 148 and 154. When this venting occurs, the pressure supplied by chamber 76 on the poppet valve will cause it to move rapidly towards surface 50 and the full line pressure of reservoir 76 will act on the upper end of piston 70 to drive it through its impact stroke. The piston 70 will not return to its raised position until feeler 156 and trigger 106 are both released.

In cattle stunning operations, the hammer is made long enough for it to extend approximately three inches from the bottom of nozzle 6 when the piston is in its down position against bumper 74. It should be noted, however, that in its retracted position the hammer used in a cattle stunner still has its tip positioned substantially above the tip of feeler 156, in order that feeler 156 may be suitably retracted upon contact with a firm surface so as to activate valve 120. The bottom of hammer 64 may be formed perfectly flat, though it is generally preferred that it be made with a concave surface 166 in order to form sharp edge 167 at the perimeter of the hammer bottom to facilitate puncturing bone and cartilage. In addition, it is generally desired to hang the tool from an automatic balancing device attached to the ceiling so as to make the tool appear relatively weightless to an operator. An eyelet 200 is mounted to top cap 4 for this purpose.

It should be also noted that the present invention is not restricted to use as a cattle stunner. The tool might be used as a device for puncturing sheet metal, in which case the end of hammer 64 might or might not be formed flat. Alternatively, the tool might be used for hammering operations. Again, the end of hammer 64 might be formed flat, or possibly rounded for ballpeening, depending on the application. It is also possible to employ the tool as a riveter. It is further envisioned that in some of these applications it may be desirable to mount the tool housing in a cabinet or housing for use in a production line. These and other applications of the present invention will be obvious to persons skilled in the art.

It should be noted that the preferred embodiment illustrated and described herein is intended solely for the sake of example and clarity and should in no way be construed as limiting the scope of the present invention, since various alterations may be carried out on the illustrated embodiment without departing from the essential features of the invention. Thus, for example, one may alter the exterior casing of the tool to facilitate gripping and using the tool. Or one might move the location of feeler 156 from its present location surrounding hammer 64 to a new location near hammer 64, in the manner of the safety rod of the device disclosed in U.S. patent application Ser. No. 763,061 and U.S. Pat. No. 4,040,554. Furthermore, although in the preferred embodiment the hammer is normally flush with or slightly retracted from the end surface of the nozzle, in practice the hammer may extend below the end surface of the nozzle, if desired. In any event, the feeler member 156 will always extend below the end surface of the hammer so long as the hammer is in its retracted position and the feeler member is in its extended position, and the feeler member will always extend below the end surface of the nozzle when the feeler member is in its extended position.

These and other changes of their type are foreseen as readily obvious to one skilled in the art, and hence are considered within the scope of the present invention.

ADVANTAGES OF THE PRESENT INVENTION

There are significant advantages to using the present tool in cattle stunning applications instead of certain tools now employed. First, the new tool is quieter, cheaper, more reliable, lighter and safer. Second, the stunner may be bump-fired, i.e. it can be fired (if previously primed) by simply touching it to the rear of the animal's head. This bump-firing feature speeds up operation of the tool and gives the animal less time to move before slaughtering. Third, the tool disassembles easily for cleaning and repair. Still other attendant advantages will be obvious to one skilled in the art.

What I claim is:

1. A penumatic tool comprising:
   a hollow housing having upper and lower ends;
   a hollow cylinder mounted in said housing, said cylinder having upper and lower ends;
   a piston slidably mounted in said cylinder;
   a hammer connected to said piston and having a striking surface;
   lower end means for closing off said lower ends of said cylinder and said housing, said lower end means having a first bore therein for slidably receiving said hammer;
   an air reservoir defined within said housing, said housing having an inlet for connecting said reservoir to a regulated source of high pressure air;
   a primer valve for alternately (1) transmitting high pressure air from said air reservoir to said lower end of said cylinder below said piston, or (2) exhausting high pressure air from said lower end of said cylinder below said piston;
   selectively operable mechanical means for operating said primer valve;
   a poppet valve for rapidly opening up or closing off said upper end of said cylinder above said piston, in order that high pressure air from said air reservoir may or may not be admitted rapidly to the upper end of said cylinder above said piston;
   an elongate feeler rod mounted in said lower end means and adapted for movement between a first extended position and a second retracted position, said feeler rod extending substantially below said hammer when said piston is positioned at said upper end of said cylinder and said feeler rod is positioned in said first extended position, said feeler rod being arranged to be moved by an object from said first extended position to said second retracted position when said tool is engaged with said object;
   a feeler-operated control valve disposed at least partly within said lower end means and adapted for alternately (1) transmitting high pressure air to said poppet valve so as to cause said poppet valve to close off said upper end of said cylinder above said piston when said feeler rod is in said first extended position, or (2) exhausting said high pressure air from said poppet valve so as to cause said poppet valve to open up said upper end of said cylinder above said piston when said feeler rod is in said second retracted position, in order that said piston may be driven from said upper end of said cylinder to said lower end of said cylinder when and only when (1) said primer valve has exhausted high pressure air and (2) said feeler-operated control valve has exhausted said high pressure air from said poppet valve so as to cause said poppet valve to open up said upper end of said cylinder above said piston to the high pressure air of said air reservoir, said primer valve and said feeler-operated control valve being operable independently of one another.

2. A tool according to claim 1 wherein said hammer is formed with a sharp striking surface.

3. A tool according to claim 2 wherein said hammer is formed with a concave end surface terminating in a sharp rim, in order that the hammer may easily penetrate a work surface.

4. A tool according to claim 1 wherein the stroke of said piston is set so that beyond said lower end means the striking surface of said hammer has a stroke of approximately three inches.

5. A tool according to claim 1 wherein said feeler rod is provided with a longitudinal bore for slidably receiving said hammer.

6. A tool according to claim 1 wherein said primer valve is disposed within said housing.

7. A tool according to claim 6 wherein said feeler-operated control valve comprises a feeler valve casing and a feeler valve member within said casing, said feeler valve casing having a first port leading to said air reservoir, a second port leading to said poppet valve, and a third port leading to the atmosphere outside of said housing, said feeler valve member being movable so as to alternately connect said second port with said first port or said third port, and further including means mechanically connecting said feeler rod to said valve member so that movement of said feeler rod into said lower end means will cause said feeler valve member to connect said second port with said third port.

8. A tool according to claim 7 wherein said feeler rod is hollow and slidably surrounds a portion of said hammer.

* * * * *